US008069411B2

(12) United States Patent
Titemore et al.

(10) Patent No.: US 8,069,411 B2
(45) Date of Patent: Nov. 29, 2011

(54) SYSTEM AND METHOD FOR AUTO-REUSE OF DOCUMENT TEXT

(75) Inventors: Robert G. Titemore, Lexington, MA (US); Sean Gervais, Dorchester, MA (US); Keith W. Boone, Randolph, MA (US)

(73) Assignee: Dictaphone Corporation, Stratford, CT (US)

( * ) Notice: Subject to any disclaimer, the term of this patent is extended or adjusted under 35 U.S.C. 154(b) by 933 days.

(21) Appl. No.: 11/481,359

(22) Filed: Jul. 5, 2006

(65) Prior Publication Data

US 2007/0011608 A1 Jan. 11, 2007

Related U.S. Application Data

(60) Provisional application No. 60/696,677, filed on Jul. 5, 2005.

(51) Int. Cl.
*G06N 3/00* (2006.01)
(52) U.S. Cl. ........................................ 715/255
(58) Field of Classification Search ............... 709/209; 715/224, 234, 243, 254
See application file for complete search history.

(56) References Cited

U.S. PATENT DOCUMENTS

| | | |
|---|---|---|
| 4,477,698 A | 10/1984 | Szlam et al. |
| 4,965,763 A | 10/1990 | Zamora |
| 5,253,164 A | 10/1993 | Holloway et al. |
| 5,325,293 A | 6/1994 | Dorne |
| 5,327,341 A | 7/1994 | Whalen et al. |
| 5,392,209 A | 2/1995 | Eason et al. |
| 5,544,360 A | 8/1996 | Lewak et al. .................. 707/1 |
| 5,664,109 A | 9/1997 | Johnson et al. ................. 705/2 |
| 5,675,788 A * | 10/1997 | Husick et al. ............. 707/104.1 |
| 5,799,268 A | 8/1998 | Boguraev ......................... 704/9 |
| 5,809,476 A | 9/1998 | Ryan |
| 5,832,450 A | 11/1998 | Myers et al. ..................... 705/3 |

(Continued)

FOREIGN PATENT DOCUMENTS

EP 0584454 3/1994

(Continued)

OTHER PUBLICATIONS

McGregor, C. et al. "The e-baby data warehouse: a case study" System Sciences, 2002, HICSS, Proceedings of the 35th Hawaii International Conference on Systems Sciences, Jan. 7-10, 2001, Piscataway, NJ, US, IEEE, Los Alamitos, CA, USA, Jan. 7, 2001, pp. 2871-2877.

(Continued)

*Primary Examiner* — Kyle Stork
(74) *Attorney, Agent, or Firm* — Wolf, Greenfield & Sacks, P.C.

(57) ABSTRACT

A system and method for automatically reusing document text (e.g. repeated phrases or lists) in a newly created document having a predetermined document type (e.g. medical record). The present invention determines whether business rules exist for the predetermined document type associated with the newly created document. If business rules for the predetermined document type exist, the present invention determines whether the user has previously requested document text reuse for the newly created document. If the user has not previously requested document text reuse for the newly created document, the present invention selects document text from one or more stored documents in accordance with the business rules for the predetermined document type corresponding to the newly created document. The present invention then automatically inserts the selected document text into the newly created document.

22 Claims, 7 Drawing Sheets

U.S. PATENT DOCUMENTS

| | | | |
|---|---|---|---|
| 5,970,463 | A | 10/1999 | Cave et al. |
| 5,974,412 | A | 10/1999 | Hazlehurst et al. |
| 6,006,221 | A | 12/1999 | Liddy et al. |
| 6,014,663 | A | 1/2000 | Rivette et al. ............... 707/4 |
| 6,021,202 | A | 2/2000 | Anderson et al. |
| 6,052,693 | A | 4/2000 | Smith et al. ........... 707/104.1 |
| 6,055,494 | A | 4/2000 | Friedman ................... 704/9 |
| 6,088,437 | A | 7/2000 | Amick |
| 6,182,029 | B1 | 1/2001 | Friedman ................... 704/9 |
| 6,192,112 | B1 | 2/2001 | Rapaport et al. |
| 6,199,079 | B1* | 3/2001 | Gupta et al. ............. 715/207 |
| 6,289,353 | B1 | 9/2001 | Hazlehurst et al. |
| 6,292,771 | B1 | 9/2001 | Haug et al. |
| 6,347,329 | B1 | 2/2002 | Evans |
| 6,360,215 | B1 | 3/2002 | Judd et al. |
| 6,405,165 | B1 | 6/2002 | Blum et al. |
| 6,434,547 | B1 | 8/2002 | Mishelevich et al. |
| 6,438,533 | B1 | 8/2002 | Spackman et al. |
| 6,499,041 | B1* | 12/2002 | Breslau et al. ............ 715/210 |
| 6,553,385 | B2 | 4/2003 | Johnson et al. ......... 707/104.1 |
| 6,684,188 | B1 | 1/2004 | Mitchell et al. |
| 6,915,254 | B1 | 7/2005 | Heinze et al. |
| 6,947,936 | B1 | 9/2005 | Suermondt et al. ............ 707/7 |
| 7,124,144 | B2 | 10/2006 | Christianson et al. ...... 707/102 |
| 7,278,094 | B1* | 10/2007 | Dreyer et al. ............ 715/234 |
| 7,315,811 | B2 | 1/2008 | Cote et al. |
| 7,379,946 | B2 | 5/2008 | Carus et al. |
| 7,542,909 | B2 | 6/2009 | Cote |
| 7,774,196 | B2 | 8/2010 | Cote et al. |
| 7,783,474 | B2 | 8/2010 | Cote et al. |
| 2002/0007285 | A1 | 1/2002 | Rappaport ................. 705/2 |
| 2002/0095313 | A1 | 7/2002 | Haq ....................... 705/2 |
| 2002/0103826 | A1* | 8/2002 | Kriho et al. ............. 707/505 |
| 2002/0143818 | A1* | 10/2002 | Roberts et al. ........... 707/513 |
| 2002/0143824 | A1 | 10/2002 | Lee et al. ............... 707/523 |
| 2002/0169764 | A1 | 11/2002 | Kincaid et al. ............ 707/3 |
| 2003/0046264 | A1 | 3/2003 | Kauffman ................. 707/1 |
| 2003/0061201 | A1 | 3/2003 | Grefenstette et al. ....... 707/3 |
| 2003/0109936 | A1* | 6/2003 | Umen et al. ............... 700/1 |
| 2003/0115080 | A1 | 6/2003 | Kasravi et al. ............ 705/1 |
| 2003/0154080 | A1 | 8/2003 | Godsey et al. |
| 2003/0208382 | A1 | 11/2003 | Westfall ................. 705/3 |
| 2003/0233344 | A1* | 12/2003 | Kuno et al. .............. 707/3 |
| 2003/0233345 | A1 | 12/2003 | Perisic et al. ........... 707/3 |
| 2004/0103075 | A1 | 5/2004 | Kim et al. ............... 707/1 |
| 2004/0139400 | A1 | 7/2004 | Allam et al. ............. 715/526 |
| 2004/0186746 | A1 | 9/2004 | Angst et al. ............. 705/3 |
| 2004/0220895 | A1 | 11/2004 | Carus et al. |
| 2004/0243545 | A1 | 12/2004 | Boone et al. |
| 2004/0243551 | A1 | 12/2004 | Boone et al. |
| 2004/0243552 | A1 | 12/2004 | Titemore et al. |
| 2004/0243614 | A1 | 12/2004 | Boone et al. |
| 2005/0039033 | A1* | 2/2005 | Meyers et al. ............ 713/193 |
| 2005/0108010 | A1 | 5/2005 | Frankel et al. |
| 2005/0114122 | A1 | 5/2005 | Uhrbach et al. |
| 2005/0120020 | A1 | 6/2005 | Carus et al. |
| 2005/0120300 | A1 | 6/2005 | Schwager et al. |
| 2005/0144184 | A1 | 6/2005 | Carus et al. |
| 2005/0183006 | A1* | 8/2005 | Rivers-Moore et al. ...... 715/513 |
| 2005/0192792 | A1 | 9/2005 | Carus et al. |
| 2005/0198563 | A1* | 9/2005 | Kristjansson ............. 715/507 |
| 2006/0075337 | A1* | 4/2006 | Jones et al. .............. 715/530 |

FOREIGN PATENT DOCUMENTS

| | | |
|---|---|---|
| WO | WO 9530201 | 11/1995 |

OTHER PUBLICATIONS

Extended European Search Report from European Application 06786051 dated Jul. 8, 2010.

Examination Report and Supplementary European Search Report from European Application EP04753663, dated Dec. 20, 2007.

Smith et al., "Microarras: An Advanced Full-Text Retrieval and Analysis System," ACM 1987, p. 187-195.

Fei Song et al., A Graphical Interface to a Semantic Medical Information System, Journal of Foundations of Computing and Decision Sciences, 22(2), 1997.

Fei Song, et al., A Cognitive Model for the Implementation of Medical Problem Lists, Proc. of the First Congress on Computational Medicine, Public Health and Biotechnology, Austin, TX, 1994.

Fei Song, et al., A Graphical Interface to a Semantic Medical Information System, Karp-95 Proc. of the Second International Symposium on Knowledge Acquisition, Representation and Processing, pp. 107-109, 1995.

Epic Web Training Manual, EpicWeb pp. 1-33, downloaded May 2, 2002.

B. Hieb, Research Note, NLP Basics for Healthcare, Gartner Research, Aug. 16, 2002.

C. Shalizi et al., Pattern Discovery in Time Series, Part I: Theory, Algorithm, Analysis and Convergence, J. of Machine Learning Research, (2002), Submitted Oct. 28, 2002, published 2002.

C. Nevill-Manning et al., The Development of Holte's 1R Classifier, Dept. of Computer Science, University of Waikato, New Zealand, undated.

Cutting et al., A Practical Part-of-Speech Tagger, Xerox Palo Alto Research Center, undated.

Zavrel et al., Recent Advances in Memory-Based Part-of-Speech Tagging, ILK/Computational Linguistics, Tilburg University, The Netherlands, undated.

Brill, Some Advances in Transformation-Based Part of Speech Tagging, Spoken Language Systems Group, Massachusetts Institute of Technology, undated.

Nivre, DAC723: Language Technology Finite State Morphology, Vaxjo University of Mathematics and Systems Engineering, p. 1/11, undated.

Creutz, Morphology and Finite-State Transducers, Oct. 31, 2001, Chap. 3, Jurafsky & Martin.

http://www.comp.lancs.ac.uk/computing/research/stemming/general/index.htm downloaded Jul. 19, 2004.

http://www.comp.lancs.ac.uk/computing/research/stemming/general/stemmingerrors.htm downloaded Jul. 19, 2004.

http://www.comp.lancs.ac.uk/computing/research/stemming/general/performance.htm, downloaded Jul. 19, 2004.

Lee et al., Cleansing Data for Mining and Warehousing, Lecture Notes in Computer Science vol. 1677 archive, Proc. of the 10th International Conference on Database and Expert Systems Applications, pp. 751-760, Springer-Verlag, London 1999.

Van Rijsbergen, Search Strategies Information Retrieval, 2nd Ed., Ch. 5, Butterworths, London 1979.

Day, Extracting Knowledge from Text Using Learning by Constraint Relaxation (LCR), CSI, Florida Institute of Technology, www.csi-inc.com/CSI/pdf.jday_icim02.pdf, undated.

Gale et al., Discrimination Decisions for 100,000-Dimensional Spaces, Current Issues in Computations Linguistics, pp. 429-450, Kluwer Academic Publishers, 1994.

Daelemans et al. TiMBL: Tilburg Memory Based Learner, version 4.3 Reference Guide, ILK Research Group Technical Report Series No. 04-02 (ILK-0402), ILK Research Group, Tilburg University, Tilburg, Netherlands, Nov. 6, 2002.

Case Study: Massachusetts Medical Society, http://www.microsoft.com/resources/casestudies/CaseStudy.asp?CaseStudyID=14931 , Jan. 13, 2004.

Braithwaite, Continuity of Care Record (CCR) HL7 Board of Directors, http://www.h17.org/library/himss/2004Orlando/ContinuityofCareRecord.pdf, undated.

Waegemann, EHR vs. CCR: What is the difference between the electronic health record and the continuity of care record?, Medical Records Institute, 2004.

Press Release: Kryptiq Announces Support of CCR Initiative and Introduces New Solutions that Enable Information Portability, Accessibility and Clinical system Interoperability. http://www.kryptiq.com/News/PressReleases/27.html , downloaded Feb. 17, 2004.

Work Item Summary: WK4363 Standard Specification for the Continuity of Care Record (CCR), http://www.astm.org/cgi-bin/SoftCart.exe/DATABASE.CART/WORKITEMS/WK4363.htm?E+mystore, Mar. 3, 2004.

Continuity of Care Record (CCR): The Concept Paper of the CCR, v. 2.1b, http://www.bhtinfo.com/CCR.Concept%20Paper.1.5.doc.

Continuity of Care Record, American Academy of Family Physicians, http://www.aafp.org/x24962.xml?printxml posted Nov. 12, 2003.

Continuity of Care Record (CCR), AAFP Center for Health Information Technology, http://www.centerforhit.org/x201.xml, posted Aug. 20, 2004.

Core Measures web page, Joint Commission on Accreditation of Healthcare Organizations, http://www.jcaho.org/pms/core+measures/, downloaded Mar. 22, 2004.

Specifications Manual for National Implementation of Hospital Core Measures, v. 2.0, Joint Commission on Accreditation of Healthcare Organizations, http://www.jcaho.org/pms/core+measures/information+on+final+specifications.htm.

Code Information and Education web page, American Medical Association, http://www.ama-assn.org/ama/pub/category/3884.html, printed Mar. 22, 2004.

Category III CPT Codes, American Medical Association, http://www.ama-assn.org/ama/pub/article/3885-4897.html printed Mar. 22, 2004.

ICD-9-CM Preface (FY04), http://ftp.cdc.gov/pub/Health_Statistics/NCHS/Publications/ICD9-CM/2004/Prefac05.RTF.

ICD-9-CM Official Guidelines for Coding and Reporting, effective Oct. 1, 2003.

Yang et al. Faster algorithm of string comparison, Pattern Analysis and Applications, v. 6, No. 1, Apr. 2003: pp. 122-133.

Hardware Reference Manual, Release 3 for DOS, revised Jan. 1994, PIKA Technologies, Inc., Ontario, Canada, available at http://www.piketechnologies.com/downloads/legac/AVA%20B-Series%20Hardware%20Manual.pdf, last accessed Jul. 25, 2005.

Customizing D/41 Call Analysis, date unknown, Intel Corp., Santa Clara, California, available at http://resource.intel.com/telecom/support/appnotes/custd41d.htm, last accessed Jul. 25, 2005.

* cited by examiner

180

Auto-Reuse Confirmation:

The following rule(s) retrieved no data:
  ALLERGIES:
    *Document Rule:* From the most recent 'Work Type 1 (ID)' dictated by anyone, get the 'ALLERGIES:' Section.

The following rule(s) retrieved more than one section:
  ALLERGIES:
    *Document Rule:* From the most recent 'Work Type 2 (ID)' dictated by anyone, get the 'ALLERGIES:' Section.
      ☐ Text retrieved from a section
      ☐ Text retrieved from a section ☐ Don't Show this Message Again.

[OK] [Preview] [Cancel]

*Fig. 7*

SYSTEM AND METHOD FOR AUTO-REUSE OF DOCUMENT TEXT

CROSS REFERENCE TO RELATED APPLICATIONS

This application claims the benefit of priority of U.S. Provisional Patent Application No. 60/696,677, entitled "SYSTEM AND METHOD FOR AUTO-REUSE OF DOCUMENT TEXT," filed Jul. 5, 2005, which is hereby incorporated by reference in its entirety.

This application is directed to subject matter relating to that disclosed in U.S. patent application Ser. No. 10/448,320, entitled "SYSTEM AND METHOD FOR DATA REUSE, " filed May 30, 2003, which is hereby incorporated by reference in its entirety.

BACKGROUND OF THE INVENTION

The present invention relates generally to a system and method for the automatic reuse (hereafter referred to simply as "auto-reuse") of data and/or document text (hereafter referred to simply as "document text" or "text"). Although one envisioned application for the present invention is for the reuse of document text in medical reports, it will be appreciated that the application of the present invention is not limited to the field of medicine.

The present invention is intended to solve the problems encountered by document creators in high volume document workflows where the document creators wish to reuse text contained in preexisting documents or other information sources. Document creators often find it expedient to insert information contained in preexisting documents. Information for which reuse typically is desired includes often-repeated phrases, boilerplate text, and lists. For example, in the field of medicine, the desired information may be lists of a patient's current problems, medications, allergies, procedures, and/or a history of a patient's present illness. Medical personnel dictating medical reports may need to repeat such information in several documents, resulting in a high volume of document creation.

Some existing solutions for the reuse of document text allow users to search documents stored in a repository and reuse certain text from the stored documents when creating new documents. Other existing solutions utilize a template document structure wherein stored documents are subdivided into defined sections, which may be reused in new documents having similar sections. Still other existing solutions allow users to create documents based on querying a database containing stored documents and reusing the results of the query in the new documents.

One disadvantage of existing solutions is that they are ill-equipped to simultaneously insert information from a database, such as boilerplate text, and query and insert information from a preexisting document repository. Another disadvantage of existing solutions is that they do not enable users to create business rules to designate which sources of information are suitable for inclusion in creating documents with reused text. Because of this, users must manually pick and choose the appropriate text to be reused for each new document, making text reuse only slightly less work than retyping the text in the first place.

Therefore, a need exists for a flexible document creation system that is capable of responding better to the needs of document creators, particularly in high volume document situations. For example, there exists a need to provide medical personnel with an efficient document creation system that will save valuable time in the dictation of medical reports that often contain information present in preexisting documents residing in several sources.

SUMMARY OF THE INVENTION

The present invention advantageously provides a method readily accessible to users that operate dictation, transcription, and document creation/management systems for completing a desired document in an expedient fashion without hindering the document preparation process with unnecessary automatic processes that tend to extend document preparation time over that which is necessary for manual document creation. The present invention also advantageously provides a set of rules to auto generate document text, to select certain data from a repository and to insert the boiler plate language used to connect to other systems for short cutting previously defined text. The present invention further advantageously integrates with other modules of the Assignee's natural language processing system.

The present invention further advantageously includes the identification of sections and text within existing documents that the user wishes to include in their current document creation process. An interface feature is also included for creating the target information and business rules regarding a document. Finally the present invention advantageously allows users to determine how to select certain desired previously saved text, when to select that certain text and how to insert the selected text into a currently edited document as needed in an easy to understand and useful fashion.

As such, in a first aspect, the present invention includes a method for the automatic reuse of document text. Specifically, the present invention is directed towards a method of automatically reusing document text in which a user desiring to reuse text from one or more preexisting documents stored on a database creates a first document of a predetermined document type. The user is provided with a user interface to activate an auto-reuse of document text application. The application determines whether predetermined rules exist for the predetermined document type corresponding to the first document created by the user. If predetermined rules for the predetermined document type exist, the application determines whether the user has previously requested a document text reuse process during creation of the first document. If the user has not previously requested a document text reuse process during creation of the first document, the application automatically selects document text from the one or more preexisting documents in accordance with the predetermined rules for the predetermined document type corresponding to the first document. The application then automatically inserts the selected document text into the first document.

In a second aspect, the present invention includes an optional additional step in which the application queries the user to confirm the result of inserting the selected document text into the first document.

In a third aspect, the present invention includes two additional steps. The user is presented via a user interface with a preview of the first document showing the automatically inserted text. The user is then allowed edit the text of the first document including the automatically inserted text via the user interface.

In a fourth aspect, the present invention includes a computer system for implementing the methods. Specifically, the present invention is directed to a computer system for automatically reusing document text, which includes a computer with a computer storage medium and a computer program code mechanism embedded in the computer storage medium for causing a computer to provide a user with a user interface to activate an auto-reuse of document text application, determine whether predetermined rules exist for a predetermined document type corresponding to a first document, determine whether the user has previously requested a document text reuse process during dictation of the first document if predetermined rules for the predetermined document type exist, automatically selecting document text from the one or more preexisting documents in accordance with the predetermined rules for the predetermined document type corresponding to the first document if the user has not previously requested a document text reuse process during dictation of the first document, and automatically insert the selected document text into the first document. The computer code mechanism electronically connected to one or more first databases wherein the one or more first databases contain stored documents. The computer code mechanism is also electronically connected to one or more second databases; the one or more second databases contain definitions of predetermined document types. Furthermore, the computer code mechanism is electronically connected to one or more third databases in which the one or more third databases contain predetermined auto-reuse of document text rules corresponding to the predetermined document types. Lastly, the computer code mechanism is electronically connected to one or more fourth databases for storing documents created by the user.

In a fifth aspect, present invention includes a computer code mechanism within the computer system described above may cause the computer to provide the user with a user interface configured to allow the user to edit the predetermined auto-reuse of document text rules stored on the one or more third databases.

In a sixth aspect, the present invention includes computer system for reusing a portion of document text from an archived document in a newly created document. The system may include a computer, having a central processing unit and a computer code mechanism, a speech recognition engine operatively connected to the computer, at least one database operatively connected to the computer, at least one archived document stored in the at least one database, where the archived document contains a portion of text and the archived document is associated with a pre-determined document type, a new document stored in the database, where the new document is associated with a pre-determined document type, a set of terms stored in the database, where each term defines a pre-determined document type and at least one business rule stored in the database where each business rule is associated with a corresponding pre-determined document type. The computer may be configured to identify a document type of the new document based on the set of terms. The system according present invention may include a set of computer code instructions configured to preview the newly created document showing the inserted text. The system according present invention may also include a set a set of computer code instructions configured to edit the text of the newly created document including the inserted text.

BRIEF DESCRIPTION OF THE DRAWINGS

FIG. 7 is a view of a dialog box for auto-reuse confirmation window according to an embodiment of the system of the present invention.

DETAILED DESCRIPTION OF THE INVENTION

Figure 1:
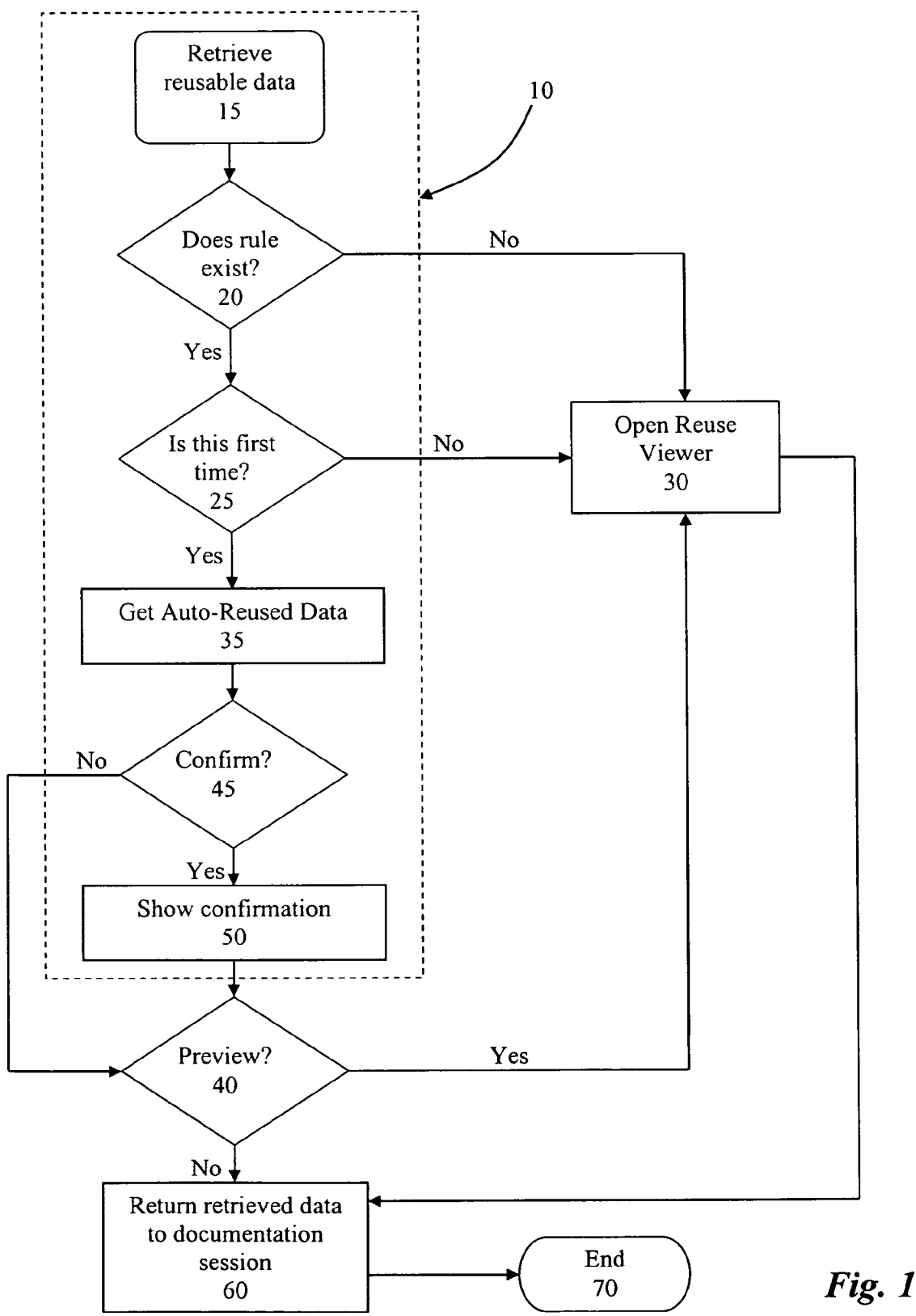
FIG. 1 is a flowchart illustrating the method of the present invention.

The present invention will now be described more fully with reference to the Figures in which the preferred embodiment of the present invention is shown. The subject matter of this disclosure may, however, be embodied in many different forms and should not be construed as being limited to the embodiment set forth herein.

The present invention allows for the efficient creation of new documents by reusing or inserting portions of document text from archived or stored documents into the new documents. Reusing portions of document text eliminates the time associated with re-entering the information into a new document, thereby allowing the new document to be created in a more expedient manner.

For example, a physician dictating medical records may reuse a portion of text relating to a patient's condition in a multitude of new documents. Instead of dictating the same information into each and every new document, the physician simply may reuse a portion of text from an existing document by inserting the portion of text into the new documents. The portion of text may be inserted by using speech commands or by manipulating the data through use of a computer, such as a desktop computer, laptop computer, or PDA device.

Document text typically is taken from one or more archived documents that are stored in a database. Document text may be anything that is often repeated during the dictation process. Typically, document text includes repeated phrases, boilerplate text, and lists. An example of document text is a list of a patient's current problems, medications, allergies, procedures, and/or a history of a patient's present illness.

The system of the present invention includes a computer having a central processing unit (CPU) for implementing a software application or a plurality of computer code instructions. The computer code instructions implement the steps of the method of the present invention.

The computer may be a personal computer, either desktop or laptop, with customary interfaces such as a keyboard, mouse, and video and sound devices. Alternatively, the computer may be a personal digital assistant (PDA), such as a Palm® or BlackBerry® device, or other portable device.

The system also includes one or more databases containing the archived documents as well as the newly created documents. For instance, one database may contain archived or stored documents from which document text is reused. Another database may contain the predetermined rules governing the automatic reuse ("auto-reuse") of document text. Yet another database may contain information related to the document types, such as specific templates for use with dictation. One such template is a medical chart used by a physician during the dictation of patient information. Still another database may contain the newly created documents which include the reused document text. Alternatively, all of the above may be stored on a single database, or some of the above may be combined and stored on the same database.

The method of the present invention generally encompasses the steps of creating a document based on a predetermined document type, determining a rule set for the document type, retrieving data from at least one data source based on at least one rule in the rule set, and populating the document with the retrieved data.

Referring now to the drawings, wherein like reference numerals designate identical or corresponding parts throughout the several views, FIG. 1 shows a flowchart which depicts the method of the present invention. FIGS. 2-7 depict an example of the present invention as embodied within a computer software application and displayed with a graphical user interface in a series of dialog boxes on a computer screen.

Referring now to FIG. 1, reference numeral 10 designates the computer-implemented steps which may be performed by the system of the present invention using a software application or a plurality of computer code instructions. With reference to box 15, a user activates the auto reuse process, which may be done by clicking on a mouse or keyboard button or by entering a command.

As indicated by box 20, the first step of the method is to determine whether pre-existing business rules for auto reuse have been previously defined by a user. If there are no pre-existing rules, then the system initiates another document reuse method, as indicated by box 30, which is not the focus of the present invention. Box 30 refers to the "Reuse Viewer" document reuse method, which is disclosed in co-pending U.S. patent application Ser. No. 10/448,320, entitled "SYSTEM AND METHOD FOR DATA REUSE," filed May 30, 2003, which is herein incorporated by reference.

The pre-existing business rules, which are defined by the user, may be based on the document type. For instance, the rules may determine which type of data should be retrieved for a specific document type. Additionally, the user may define the business rules for the system by example. Further, the business rules may be executed by the user upon voice activation, such as with specific speech commands uttered during the dictation process.

If there are preexisting rules, the method then determines whether the user has previously inserted reused text in a particular document, as indicated by box 25. If it is not the first time a user has requested reuse on the document, then the system initiates the "Reuse Viewer" document reuse method, as indicated by box 30 and described above. If it is the first time a user has requested reuse on a document, then the system searches for reuse data, as indicated by box 35.

Reuse data is automatically inserted depending on the pre-existing business rules. The rules may determine the placement location for reuse data in a document depending on the type of the document. For example, if the type of document is a medical chart, then the pre-existing business rules may instruct the system to insert reuse data from other medical charts relating to a certain patient and/or the patient's conditions, allergies, or medications.

After the reuse data is automatically inserted, the user is provided with the option of confirming the reuse data, as indicated by box 45. If the reuse is not confirmed by the user, then the method is directed to a preview option, as indicated by box 40. If confirmation is selected by the user, then the confirmation is shown to the user, as indicated by box 50.

After confirmation is shown, the user may be provided with a preview option, as indicated by box 40. The choice of whether the user wants to preview the results or just go immediately to editing the document may be incorporated into the pre-existing business rules such that this step is fully automated. If the user decides to preview the results, the "Reuse Viewer" method is activated, as indicated by box 30 and described above.

Upon completion of the auto-reuse process, the method provides the user with the newly created document, as indicated by box 60. The creation of the newly created document terminates the process, as indicated by box 70.

ALM Section

Figure 2:
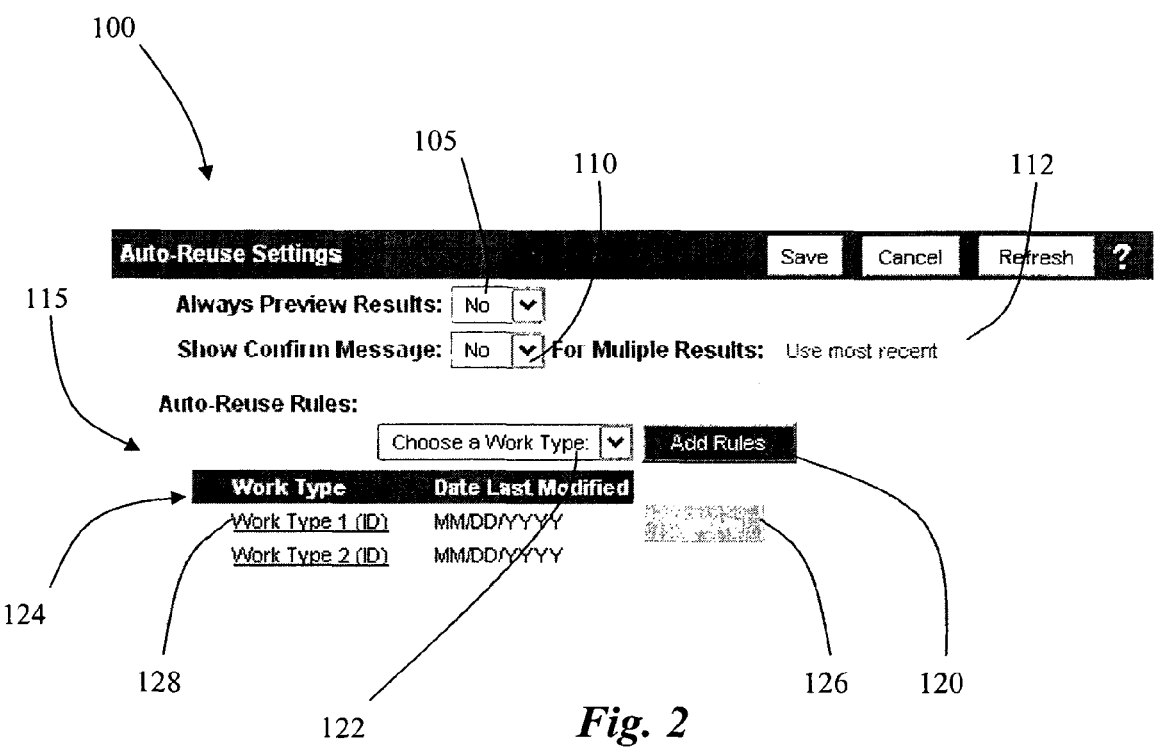
FIG. 2 is a view of a dialog box for auto-reuse preferences according to an embodiment of the system of the present invention.

Referring now to FIG. 2 a dialog box 100 is shown on a computer screen for auto-reuse user preferences according to one embodiment of the invention. Selecting box 105 labeled "Always Preview Results" allows the user to choose to automatically go to Reuse to view the returned results before adding it to the user's dictation. The options in the select box are "Yes" and "No," and the default selection is "No."

Selecting box 110 labeled "Show Confirm Message" controls whether the query result is confirmed at the end of the Auto-Reuse query. The options in the select box are "Yes" and "No," and the default selection is "Yes."

If the confirmation is set to "No," the "For Multiple Results" drop-down menu 112 becomes enabled. The user can select the action for multiple returns that is normally done on the confirmation window. The selections of this drop-down menu are: "Use most recent," "Use all," and "Use none."

Selecting a work type from the select list box 115 under "Auto-Reuse Rules:" enables the "Add Rules" button 120. This list is populated with the available target work type templates selected from menu 122 where a user can write rules associated with the work types into which dictation will be entered.

The list of work types does not contain work types that have a rule set already defined. Clicking the "Add Rules" button 120 opens the Work Type Rule Set Editor 130 with the selected work type template, as described hereafter in conjunction with FIG. 3.

Clicking anywhere on a row in the work type rule set table selects that work type 124 and highlights the row. Clicking a row also enables the "Remove" button 126. Clicking the Remove button triggers a confirm message. If the user confirms the delete, the selected rule set for that work type is removed from the list.

Clicking on the work type name 128, which is underlined in the user interface, the Work Type Rule Set Editor 130 is opened with the selected work type template and all the current set of rules for it.

Figure 3:
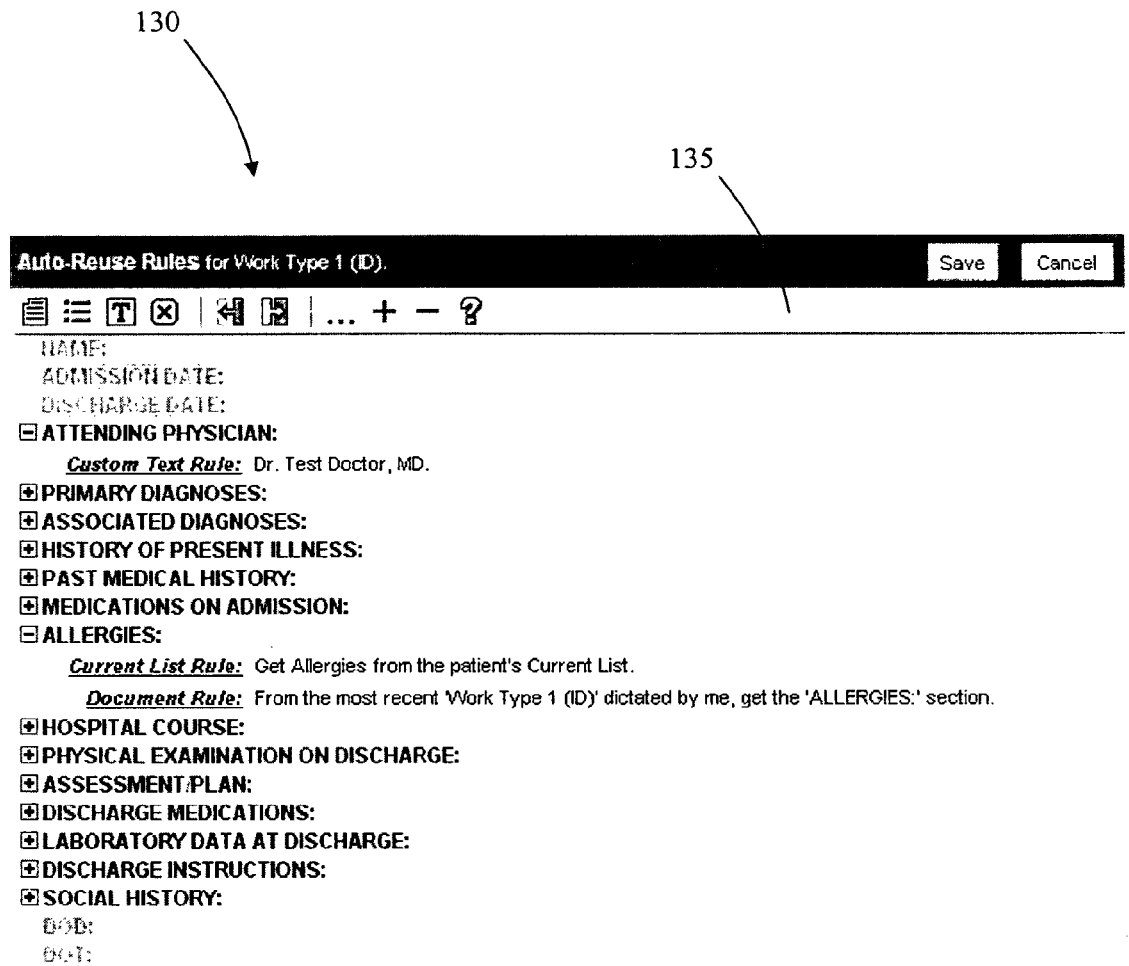
FIG. 3 is a view of a dialog box for auto-reuse rule sets according to an embodiment of the system of the present invention.

Referring now to FIG. 3, the Work Type Rule Set Editor 130 is used to add, remove, and edit rules for an individual work type. There are multiple ways to edit the rule set. The editor provides both a menu tool bar 135 and right-click contextual menu (not shown) for adding, editing, and deleting rules. Additionally, existing rules can be modified by clicking the rule label.

This editor allows for multiple ways to select rules and sections. Clicking a section heading selects that section and all of its rules. It also toggles the tree control for that section. Clicking an individual rule (in any section), clears all previously selected sections and rules and then highlights that rule. Clicking a section or rule, that was not previously highlighted, while holding down the control key will add the section or rule to the total list of selected items. Clicking a section or rule, that was previously highlighted, while holding down the control key will remove the section or rule from the total list of selected items.

The selected template rules or sections change the available functions in the menu bar and context menu as appropriate. The menu tool bar 135 contains iconic buttons that can be use to add, delete, or edit rules. It has iconic buttons to roll back ("undo") the last rule change or to "redo" the last "undo." It also contains iconic buttons to control elision, to collapse or expand the sections and to link to the component help.

The context menu appears when a user right-clicks on some part of the work type. The options in the menu depend on the user selection of the work type template but are limited to adding, editing and deleting rules.

Clicking a rule's label (the underlined text preceding the each rule), the appropriate rule editor is opened with the rule's specifications. This allows a user to quickly edit an existing rule.

Users can create rules that retrieve section text from an existing document and add the text to the user's current dictation. There are two kinds of document rules. "Specific section" rules get the text of a single reusable section from an existing document and add it a section in the current dictation. A "Whole document" rule gets all reusable sections from existing documents and adds them to a selected section in the current dictation.

The list of available work types and sections are derived from a combination of known templates and documents using those work types previously dictated. The likelihood of a section being part of a document's template is used to generate the list. This is a system parameter that may be set as part of the administration.

Users can quickly add rules to the template by using the "matching sections" process which creates multiple "one section" rules based on sections that exist in both the current template and the existing document.

Figure 4A:
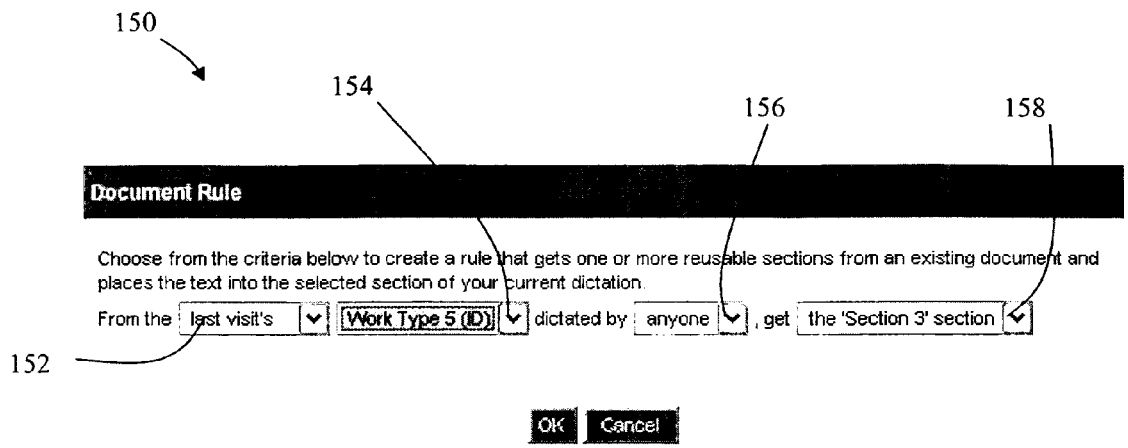
FIGS. 4A-4C are views of a dialog box for auto-reuse rule sets according to an embodiment of the system of the present invention.

Referring to FIG. 4A, there is shown a dialog box 150 for a document rule where a user can create a rule that retrieves the section text from an existing document, based on the criteria specified. The retrieved text is placed in the section of the dictation based on the rule's location in the template rule set.

The user can specify time frames in menu 152, "last visit's" or "most recent." The user can specify the existing document's work type in menu 154, who dictated the document in menu 156 (i.e. "me" or "anyone") and which section of the existing document they want to place in their dictation in menu 158.

Figure 4B:
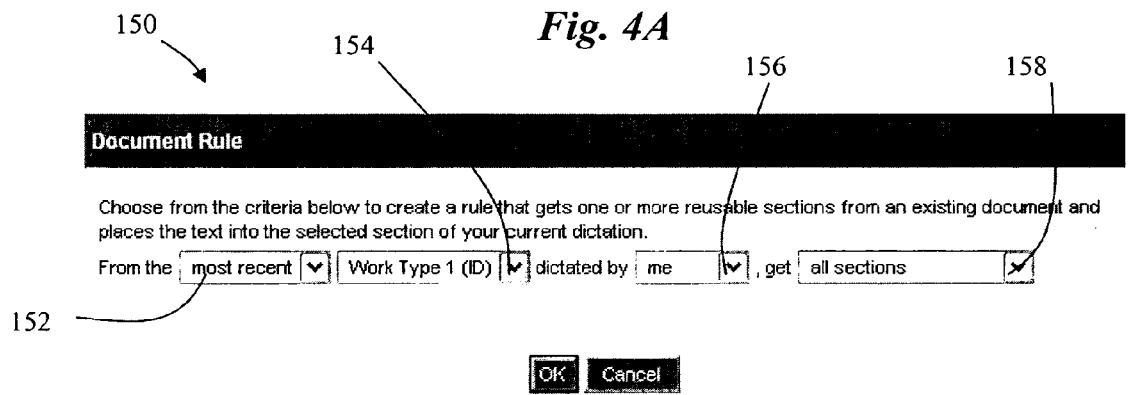

Referring to FIG. 4B, there is shown a dialog box 150 where a single document rule will be added to the selected section of the work type in the editor window listing the specified criteria.

A user can create a rule that retrieves all the sections (and included text) from an existing document, based on the criteria specified. The retrieved section headers and text are placed in the section of the dictation based on the rule's location in the template rule set. Due to integration issues, section headers from existing documents used in sections of the dictation may be marked up as paragraphs and not as true section markups. This may create "sub-headers" in the dictations unlike the specific section rule which may not add new headers.

Figure 4C:
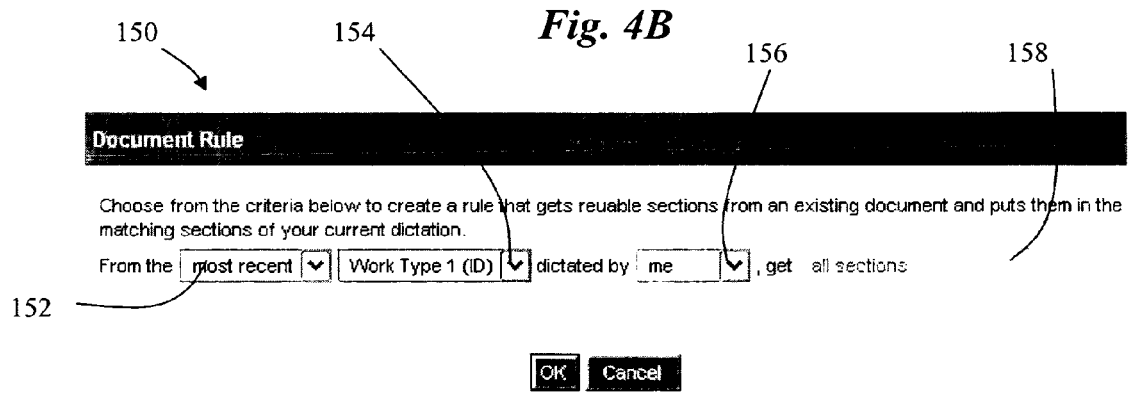

Referring to FIG. 4C, there is shown a dialog box 150 where a single document rule will be added to the selected section of the work type in the editor window listing the specified criteria.

The user can quickly create several rules at one time based on "matching sections" of existing document work types. This creation process makes one or more "one section" rules based on sections which exist in both the current template and the document work type chosen from the list. Once created, each rule is treated as if it was created by the specific section document rule process.

One or more document rules may be added to the sections of the work type in the editor window which match the sections in the selected document work type. Each document rule will list the specified criteria.

Figure 5:
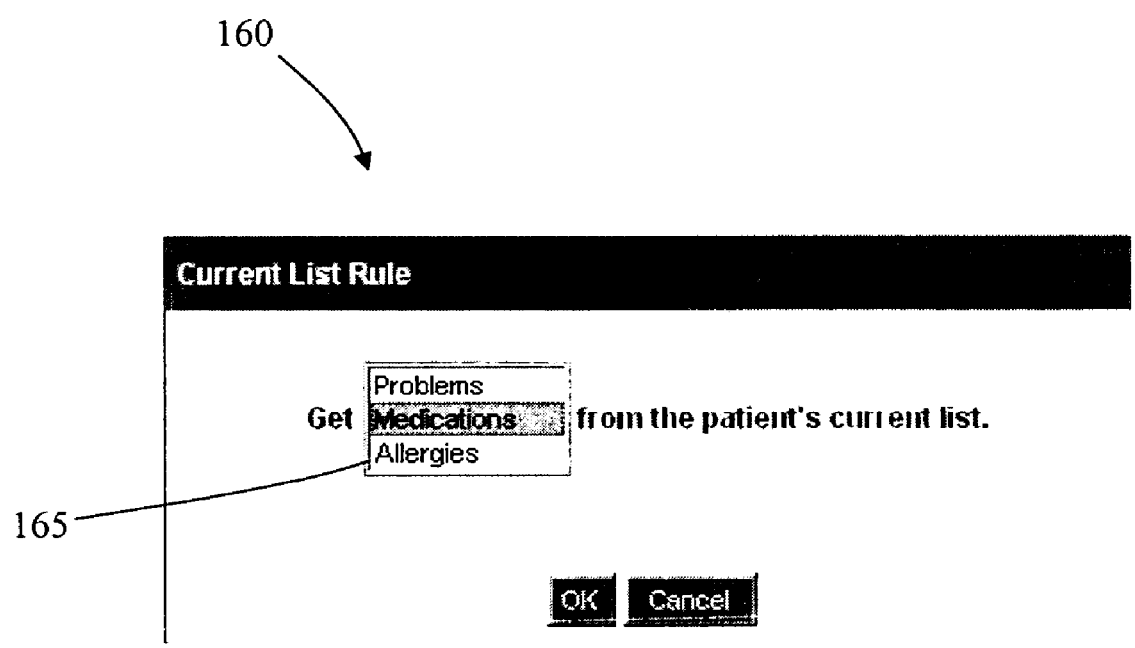
FIG. 5 is a view of a dialog box for a current list rule in a selected dictation section according to an embodiment of the system of the present invention.

Referring now to FIG. 5, there is shown a dialog box 160 where users can add a rule to the selected section in menu 165 which gets fact types of "Problems," "Medications," and/or "Allergies" from the patient's current list, as an example. When auto-reuse executes the rules, the current list items selected will be added to the dictation as an enumerated list with headings based on the type of fact. A single current list rule will be added to the selected section of the work type in the editor window listing which fact types will be pulled from the current list.

Figure 6:
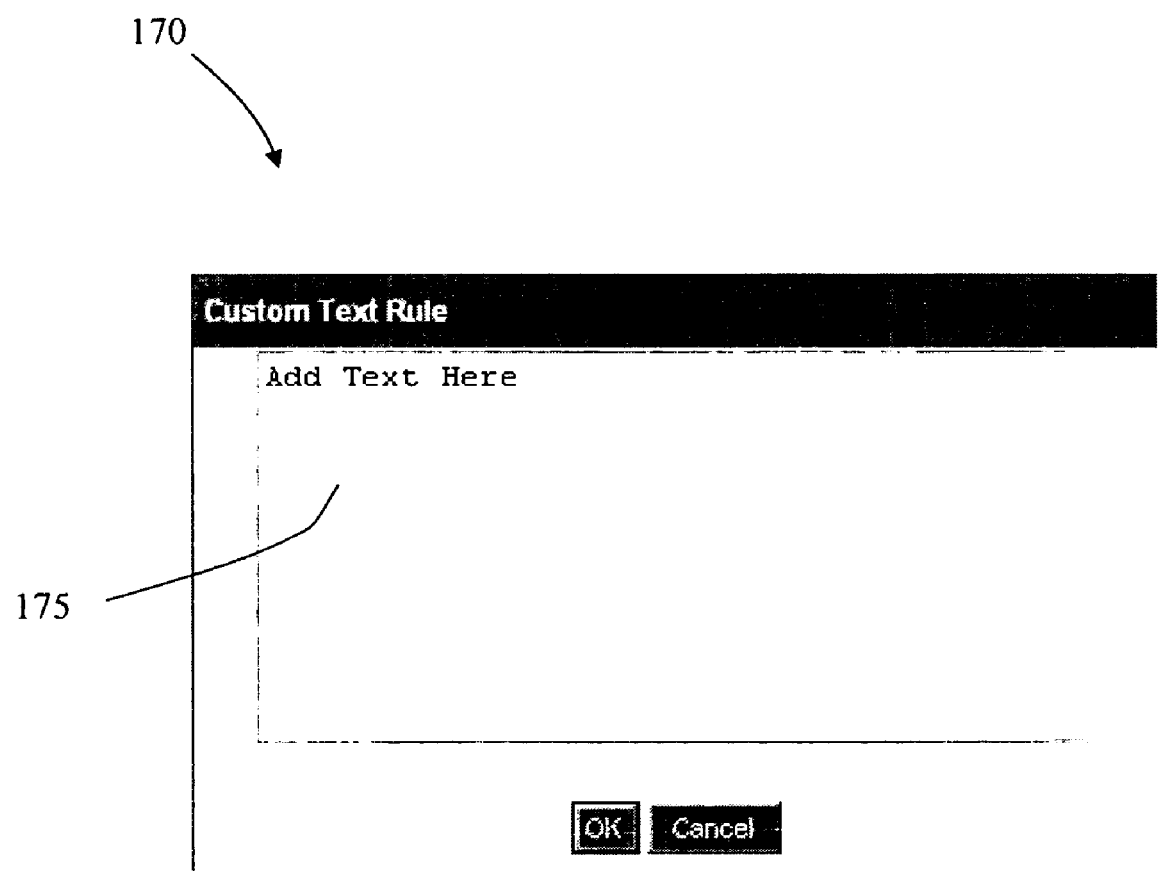
FIG. 6 is a view of a dialog box for custom text rule selection in a selected dictation section according to an embodiment of the system of the present invention.

Referring to FIG. 6, there is shown a dialog box 170 where users can add static text to the section of a work type in space 175. The user types in the text desired to be seen in the section of the work type. The text will appear in the dictation when auto-reuse executes the rule. A single custom text rule will be added to the selected section of the work type in the editor when user selects "OK."

When a rule is selected, the "Delete" button in the menu bar becomes enabled. The user can click that button to remove the currently selected rules. Additionally, by right-clicking, the pop-up context menu will contain a delete function. When delete is requested, the user is presented with a confirm box. If the user confirms the delete, all the selected rules are removed from the rule set. To delete all the rules for a work type, a user must close the Work Type Rules Editor and remove the rule set from the list.

Clicking on an underlined rule header ("Custom Text Rule:", "Document Rule:", or "Current List Rule:") opens the corresponding rule editor. Unlike when adding the rule, the selected rule's information will be displayed. If the user changes any of the rule's criteria and clicks the "OK" button, the selected rule will be replaced with a rule consisting of the new criteria.

Auto-Reuse may be triggered by a call to the Reuse Viewer. If a user has not set up auto-reuse rules for the work type being dictated, the user is directed to the Reuse viewer as normal. If there are rules defined, the auto-reuse process is triggered. Auto-reuse is a process which can be called externally as well. The integration with Reuse will include a new optional parameter to prevent auto-reuse from being called from Reuse if the container application has integrated auto-reuse in another way. The first-time determination is done by auto-reuse and is parameterized as well.

Auto-reuse rules are only executed once for any given dictation on the first time the user clicks reuse for that patient and dictation work type. After auto-reuse executes the rules, it creates a reuse output consisting of all the returned document text. The text can be further refined by the confirmation process.

If a results preview is desired, either by user preference or user choice, the user is redirected to the Reuse Viewer which presents the user with the auto-reuse output. They can edit the results there. If preview is not chosen, then auto-reuse output is sent back to current dictation.

When document rules are executed, they find all the documents that match the given rule's criteria and return one or more sections from the matching documents. The results are added to the reuse output as described below.

When a specific section document rule is executed it returns a single section and the corresponding paragraphs from the document search results that matched the criteria. The work type, time frame, and author filters are used to find documents. The chosen section type is then searched for within the returned document set. The returned section's content is added to the selected section of the reuse output.

Auto-reuse will use the section heading and/or some internal identifiers to find the requested section. Additional embodiments contemplate allowing a user to search for section groups. The internal attributes may be used to group sections in the Reuse Viewer and in the Document Details report.

When a whole document rule is executed, it returns a set of sections and paragraphs from the found result documents that matched the criteria. The documents' reusable sections are added to the selected section of the reuse output as subsections.

When a current list rule is executed it creates one or more enumerated lists of current list facts. Each list has a heading which tells what fact type it is. The lists, with heading paragraphs, are added to the selected section of the reuse output. When a custom test rule is executed, one or more paragraphs from the custom text rule will be added to the selected section of the reuse output. A paragraph is defined by carriage returns in the Custom Text Rule Editor.

Referring now to FIG. 7, there is shown a dialog box 180 for auto-reuse confirmation. If the user has "Show Confirm Message" set to "Yes," the user will be presented with a query results confirmation window. This window lets the user know of any rules that did not return results or if there are multiple returns for a rule.

For multiple returns the user can select any or all of the sections to be placed in the output. Multiple results, regardless of being confirmed by the window or in user preferences, will be added to the dictation in reverse chronological order of the document date but in the order of rule position in the work type rule set editor window.

The window has function buttons: "OK," "Preview," and "Cancel." It also has a checkbox labeled "Don't Show This Message Again." If this checkbox is checked, it will prevent this confirmation window from occurring in the future. When checked and the user pressed "OK" or "Preview" it sets the query confirmation to "No."

If the user has "Always Preview Results" from user preferences set to "Yes," the Confirmation dialog will have an "OK" and a "Cancel" button. Pressing either button opens the Reuse Viewer. If the user clicks "OK," the Reuse Draft section of the viewer will be populated with the section text successfully returned by the Auto-Reuse query.

If the user has "Always Preview Results" from user preferences set to no, the Confirmation dialog will have an "OK," a "Preview," and a "Cancel" button. Pressing "OK" or "Cancel" brings the user back to their dictation. If the user presses "OK," the section text returned by the Auto-Reuse query is returned to the caller. If the user clicks "Preview," the Reuse Viewer is opened and the Reuse Draft section of the viewer will be populated with the section text successfully returned by the Auto-Reuse query.

Additional information such as the document date, document ID or service date could be used by NLPR to determine first time. In some embodiments the calling application may supply this additional information. The calling application may supply a parameter to make sure it is truly the first call to Reuse to trigger the auto-reuse for the individual documents.

In some embodiments, the integration with the host application may be altered so that any call to auto-reuse triggers the process and is not tied to the Reuse call. In this instance, users will not be prevented from being redirected to Reuse as part of the auto-reuse confirmation process.

It will be apparent to one of skill in the art that described herein is a novel system and method for auto-reuse of document text. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. A method of reusing document text, the method comprising acts of:
    a) in response to a user requesting document text reuse for a first medical report documenting a clinical encounter with a particular patient, determining whether the user has previously requested document text reuse for the first medical report;
    b) in response to determining that the user has not previously requested document text reuse for the first medical report:
        selecting document text from at least one second medical report documenting at least one past clinical encounter with that particular patient, in accordance with one or more rules for a document type corresponding to the first medical report, and
        inserting the selected document text into the first medical report; and
    c) in response to determining that the user has previously requested document text reuse for the first medical report, initiating another document reuse method, wherein the other document reuse method is not based on the one or more rules.

2. The method according to claim 1, further comprising offering confirmation of a result of inserting the selected document text into the first medical report.

3. The method according to claim 1, further comprising presenting a preview of the first medical report including the inserted text.

4. The method according to claim 1, further comprising presenting the first medical report including the inserted text for editing.

5. The method according to claim 1, further comprising determining whether the one or more rules exist for the document type corresponding to the first medical report, wherein the act b) is performed only if it is determined that the one or more rules exist.

6. A computer system for reusing document text, the computer system comprising:
    a computer having a computer storage medium and a computer program code mechanism embedded in the computer storage medium for causing the computer to:
        a) provide a user with a user interface to request document text reuse for a first medical report documenting a clinical encounter with a particular patient;
        b) determine whether the user has previously requested document text reuse for the first medical report;
        c) in response to determining that the user has not previously requested document text reuse for the first medical report:
            select document text from one or more second medical reports documenting one or more past clinical encounters with that particular patient, in accordance with one or more rules for a document type corresponding to the first medical report, and insert the selected document text into the first medical report; and d) in response to determining that the user has previously requested document text reuse for the first medical report, initiate another document reuse method, wherein the other document reuse method is not based on the one or more rules.

7. The computer system according to claim 6, wherein the computer program code mechanism further causes the computer to provide the user with a user interface configured to allow the user to edit the one or more rules for the document type.

8. The computer system according to claim 6, wherein the computer program code mechanism further causes the computer to store the first medical report in a data set containing the one or more second medical reports.

9. The computer system according to claim 6, wherein the computer program code mechanism further causes the computer to determine whether the one or more rules exist for the document type corresponding to the first medical report, and perform act c) only if it is determined that the one or more rules exist.

10. A method comprising acts of:
creating, in response to a request from a user, a first medical report documenting a clinical encounter with a particular patient;
in response to the user requesting document text reuse for the first medical report, determining whether the user has previously requested document text reuse for the first medical report;
in response to determining that the user has not previously requested document text reuse for the first medical report:
retrieving data from at least one second medical report documenting at least one past clinical encounter with that particular patient, based upon at least one rule in a rule set defined by the user, and
populating the first medical report with the retrieved data; and
in response to determining that the user has previously requested document text reuse for the first medical report, initiating another document reuse method, wherein the other document reuse method is not based on the rule set.

11. The method according to claim 10, wherein the act of retrieving data comprises determining the data type for retrieval.

12. The method according to claim 11, further comprising determining placement location for the retrieved data type in the first medical report based at least upon a document type of the first medical report.

13. The method according to claim 12, further comprising selecting at least one rule in the rule set by example.

14. The method according to claim 13, further comprising executing the selected at least one rule upon voice activation.

15. A method of reusing document text, the method comprising:
creating a first medical report documenting a clinical encounter with a particular patient;
in response to a user requesting document text reuse for the first medical report, determining whether the user has previously requested document text reuse for the first medical report;
in response to determining that the user has not previously requested document text reuse for the first medical report:
selecting from a data set at least one second medical report documenting at least one past clinical encounter with that particular patient;
selecting document text from the at least one second medical report in accordance with one or more business rules, and
inserting the selected document text into the first medical report; and
in response to determining that the user has previously requested document text reuse for the first medical report, initiating another document reuse method, wherein the other document reuse method is not based on the one or more business rules.

16. The method according to claim 15, further comprising offering confirmation of a result of inserting the selected document text into the first medical report.

17. The method according to claim 15, further comprising presenting a preview of the first medical report including the inserted text.

18. The method according to claim 15, further comprising presenting the first medical report including the inserted text for editing.

19. A computer system for reusing a portion of document text from an archived document in a newly created document, the system comprising:
a computer, the computer having a central processing unit and a computer code mechanism;
at least one data set operatively connected to the computer; and
at least one archived medical report stored in the at least one data set, the at least one archived medical report documenting at least one past clinical encounter with a particular patient;
wherein the computer is configured to:
provide a user with an interface to define at least one rule to be stored in the at least one data set;
create, in response to a request from the user, a new medical report documenting a clinical encounter with that particular patient;
in response to the user requesting document text reuse for the new medical report, determine whether the user has previously requested document text reuse for the new medical report;
in response to determining that the user has not previously requested document text reuse for the new medical report:
insert text from the at least one archived medical report into the new medical report in accordance with the at least one rule, and
in response to determining that the user has previously requested document text reuse for the new medical report, initiate another document reuse method, wherein the other document reuse method is not based on the at least one rule.

20. The system according to claim 19, wherein the computer is further configured to present a preview of the new medical report including the inserted text.

21. The system according to claim 19, wherein the computer is further configured to present the new medical report including the inserted text for editing.

22. The system according to claim 19, wherein the computer is configured to insert text from the at least one archived medical report into the new medical report based at least upon a document type of the new medical report.

* * * * *